United States Patent
Zhang

(10) Patent No.: US 9,961,543 B2
(45) Date of Patent: May 1, 2018

(54) METHOD AND APPARATUS FOR WIRELESS NETWORK AUTHENTICATION AND AUTHORIZATION

(71) Applicant: Beijing Nanbao Technology Co. Ltd., Beijing (CN)

(72) Inventor: Zhaolong Zhang, Beijing (CN)

(73) Assignee: Beijing Nanbao Technology Co. Ltd., Beijing (CN)

( * ) Notice: Subject to any disclaimer, the term of this patent is extended or adjusted under 35 U.S.C. 154(b) by 160 days.

(21) Appl. No.: 14/396,026

(22) PCT Filed: Sep. 10, 2014

(86) PCT No.: PCT/CN2014/086221
§ 371 (c)(1),
(2) Date: Oct. 21, 2014

(87) PCT Pub. No.: WO2015/143847
PCT Pub. Date: Oct. 1, 2015

(65) Prior Publication Data
US 2015/0281955 A1     Oct. 1, 2015

(30) Foreign Application Priority Data

Mar. 27, 2014  (CN) .......................... 2014 1 0119442

(51) Int. Cl.
| | |
|---|---|
| *H04W 12/06* | (2009.01) |
| *H04L 29/06* | (2006.01) |
| *H04W 12/08* | (2009.01) |
| *H04W 4/02* | (2018.01) |

(52) U.S. Cl.
CPC .......... *H04W 12/06* (2013.01); *H04W 4/021* (2013.01); *H04W 12/08* (2013.01)

(58) Field of Classification Search
CPC ..... H04W 12/06; H04W 4/021; H04W 12/08; H04W 4/02; H04L 63/08; H04L 29/06
See application file for complete search history.

(56) References Cited

U.S. PATENT DOCUMENTS

| | | | | |
|---|---|---|---|---|
| 7,242,923 | B2 * | 7/2007 | Perera | H04W 12/06 455/410 |
| 8,190,129 | B2 * | 5/2012 | Ben Ayed | G06F 21/32 455/410 |
| 8,762,715 | B2 * | 6/2014 | Camp, Jr. | H04L 9/0825 713/168 |

(Continued)

*Primary Examiner* — Wasika Nipa
(74) *Attorney, Agent, or Firm* — Young Basile Hanlon & MacFarlane, P.C.

(57) ABSTRACT

A wireless router, comprising a location information acquisition module configured to acquire location information of a mobile device and an identity information collection module configured to store a predetermined location model to determine a match between the location information and the predetermined location model based on a corresponding relation between the predetermined location model and identity information of the mobile device. A wireless router further comprising an authentication and authorization module configured to determine a match between the location information and the predetermined location model and to authenticate and authorize the mobile device to access a network.

18 Claims, 2 Drawing Sheets

(56) References Cited

U.S. PATENT DOCUMENTS

| | | | | |
|---|---|---|---|---|
| 8,770,477 | B2* | 7/2014 | Hefetz | G06Q 20/32 235/380 |
| 2006/0184376 | A1* | 8/2006 | Graves | G06Q 10/087 705/28 |
| 2008/0244271 | A1* | 10/2008 | Yu | H04W 12/06 713/176 |
| 2013/0231135 | A1* | 9/2013 | Garskof | H04W 12/06 455/456.1 |
| 2013/0273960 | A1* | 10/2013 | Zhang | H04L 51/04 455/517 |
| 2014/0036703 | A1* | 2/2014 | Ding | H04W 48/04 370/252 |
| 2014/0068705 | A1* | 3/2014 | Chambers | H04L 63/08 726/1 |
| 2014/0141750 | A1* | 5/2014 | Lazaridis | H04L 63/0492 455/411 |
| 2015/0227926 | A1* | 8/2015 | Grigg | G06Q 20/40 705/64 |
| 2016/0050203 | A1* | 2/2016 | Hefetz | H04L 63/18 726/7 |

\* cited by examiner

METHOD AND APPARATUS FOR WIRELESS NETWORK AUTHENTICATION AND AUTHORIZATION

CROSS-REFERENCE TO RELATED APPLICATIONS

This application is a United States National Stage Application of International Patent Application No. PCT/CN2014/086221, filed on Sep. 10, 2014, which claims the benefit of Chinese Patent Application No. 2014101194428, filed Mar. 27, 2014, the entire contents of which are incorporated herein in their entirety by reference.

TECHNICAL FIELD

The present disclosure generally relates to electronic devices such as wireless network devices, and more particularly, to method and apparatus for authentication and authorization of wireless network devices.

BACKGROUND

Wireless local area networks have been increasingly used in homes, offices and public areas. Commonly used wireless communication technologies include, for example, IEEE 802.11 (WiFi) standards.

A wireless network can further include wireless access points (APs) and wireless network cards. For example, a user may access the Internet with a device that supports WiFi applications via a wireless AP. Devices that support WiFi applications may include, e.g. various mobile devices such as mobile phones, laptop computers, tablets, etc.

For a mobile device to access WiFi, authentication and authorization are often required. When setting up a wireless router or an AP, it is often required to set up a user name and a password, such as a system user name and password, a WiFi network password, a wide area network verified user name and/or password, etc. When accessing a WiFi network on the mobile device, a user may be required to execute operations such as searching the access list, inputting configuration parameters and signal matching. In addition, when setting up passwords and carrying out the first access, the user may be further required to choose an encryption method, such as WEP, WPA-AES, WPA-TKIP, WPA2-AES and WPA2-TKIP etc. A user who is not familiar with the WiFi access operations, such as a young child or a grown person, may need relatively more time to study and complete the operations, which affects the user experience.

SUMMARY

Disclosed herein are implementations of systems, methods and apparatus for wireless network authentication and authorization. In one aspect, the present disclosure includes a wireless router, comprising a location information acquisition module configured to acquire location information of a mobile device and an identity information collection module configured to store a predetermined location model to determine a match between the location information and the predetermined location model based on a corresponding relation between the predetermined location model and identity information of the mobile device. A wireless router further comprising an authentication and authorization module configured to determine a match between the location information and the predetermined location model and to authenticate and authorize the mobile device to access a network. A wireless router, comprising a location information acquisition module configured to acquire location information of a mobile device and an identity information collection module configured to store a predetermined location model to determine a match between the location information and the predetermined location model based on a corresponding relation between the predetermined location model and identity information of the mobile device. A wireless router further comprising an authentication and authorization module configured to determine a match between the location information and the predetermined location model and to authenticate and authorize the mobile device to access a network.

In another aspect, the present disclosure includes a method for authenticating and authorizing a mobile device comprising receiving, by a wireless router, location information of a mobile device and comparing the location information of the mobile device with a predetermined location model to determine whether a match between the location information and the predetermined location model exists. A method for authenticating and authorizing a mobile device further comprising obtaining, by the wireless router, identity information of the mobile device and completing authentication and authorization of the mobile device by permitting the mobile device to access a wireless network.

In another aspect, the present disclosure includes a non-transitory computer-readable medium having stored thereon a program of instructions executable by one or more wireless routers to cause the one or more wireless routers to: receive location information of a mobile device; compare the location information of the mobile device with a predetermined location model to determine whether a match between the location information and the predetermined location model exists; obtain identity information of the mobile device; and complete authentication and authorization of the mobile device by permitting the mobile device to access a wireless network.

Features and advantages of the present disclosure will be set forth in the description of disclosure that follows, or will be apparent from or by practice of the disclosure.

BRIEF DESCRIPTION OF THE DRAWINGS

The description here makes reference to the accompanying drawings wherein like reference numerals refer to like parts throughout the several views, and where.

DETAILED DESCRIPTION OF THE PREFERRED EMBODIMENT

Example implementations of the present disclosure will be described below with reference to the accompanying drawings. The implementations set forth in the following description do not represent all implementations or embodiments consistent with the present disclosure.

The method and apparatus are described with WiFi as an example. Other wireless network technologies that may be used in the present disclosure include, for example, WAPI, ZigBee, WiMedia, Bluetooth, etc.

Figure 1:
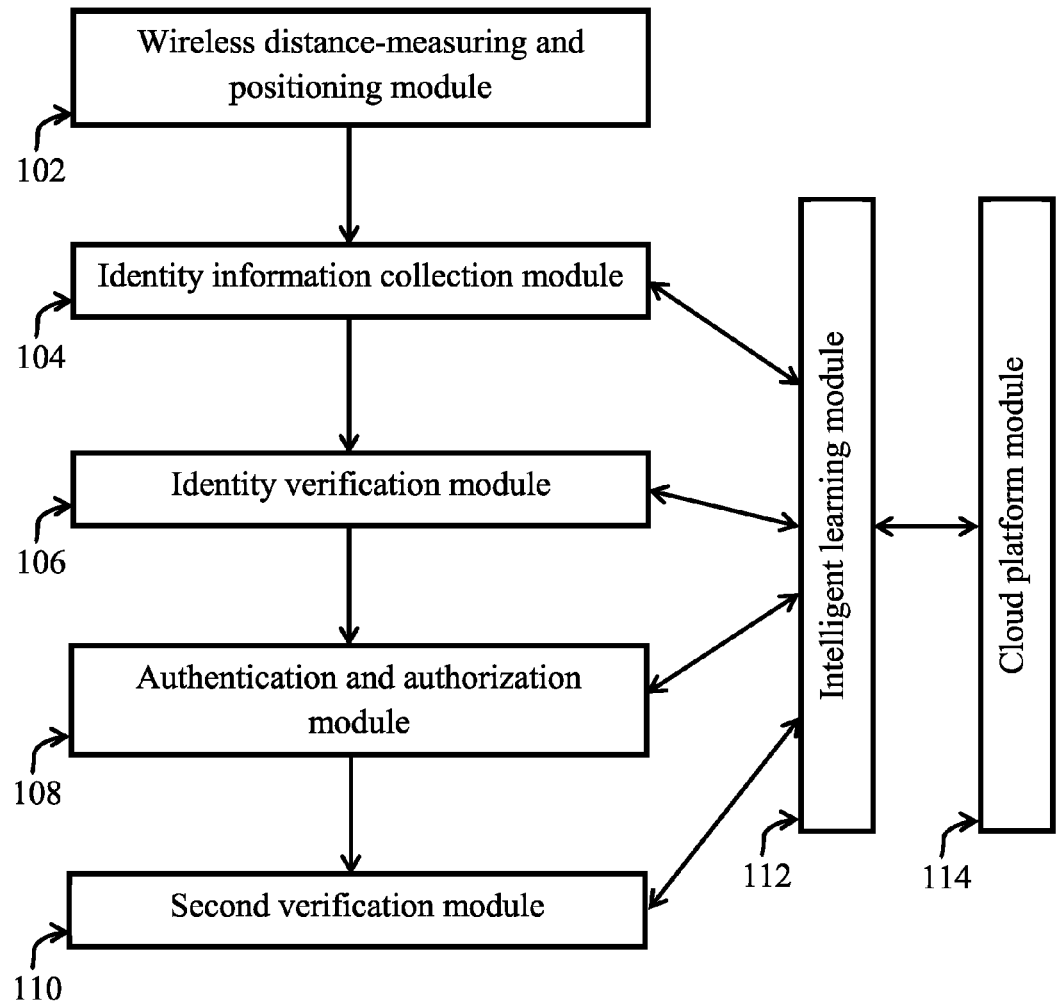
FIG. 1 illustrates an example diagram of a wireless router according to an implementation of the present disclosure.

FIG. 1 illustrates an example diagram of a wireless network device according to implementations of the present disclosure. In this example, the wireless network device is a wireless router. In some implementations, the wireless router can include a wireless distance-measuring and positioning module 102 for receiving RF signals from a mobile device, such as a mobile phone, a tablet, a laptop computer or any other mobile device and determining the distance between the mobile device and the positioning module 102 to position the mobile device. One or more positioning modules 102 can be implemented in the wireless router.

In the description herein, therefore, the term "position" or "location" has can be used to describe a mobile phone's location using one or more distance measurement results. Similarly, the term "track" should also be interpreted to have the meaning in a broad sense, which means time-dependent changes of a mobile phone's location, which can be described using distance measurement results by one or more distance measurement devices. The wireless router and the accessory distance measurement device can be used to measure the distance of a mobile phone at a certain time interval, e.g. once per second, to obtain the "track" of the mobile phone.

In one implementation, the wireless router can receive more than one distance measurement for the mobile device, such as one measurement by the wireless router itself and one or more measurement from an accessory distance measurement device, which will be described in further details below. The wireless router and the accessory distance measurement device may perform a number of distance measurements and positioning on the mobile phone at a number of time points, thereby acquiring the track information of the mobile phone.

It should be noted that the wireless distance-measuring and positioning module is just one example implementation of the location information acquisition module according to the present disclosure. In other implementations of the location information acquisition module, the mobile device itself may be installed with an application APP for wireless distance measurement and positioning, which performs distance measurement and positioning just like the wireless router does, and can send its own location information to the wireless router; the mobile device may comprise a GPS chip and positioning capability. Through communications with a GPS satellite system, the mobile device acquires its own location information and sends it to the wireless router.

As yet another disclosure of the location information acquisition module, the wireless router may acquire the location information of a mobile device from a third party, i.e. a third party other than the wireless router and the mobile device. For example, the accessory distance measurement device described above can be from a third party. It should also be understood that there may be other types of third parties, which have the location information of a mobile device and can directly or indirectly send the location information to the wireless router, and the wireless router can acquire the location information of the mobile device by receiving the information from the third party. The several ways for a wireless router to acquire the location information are not mutually exclusive. They may exist independently or be present together in various combinations.

In some implementations, an accessory distance measurement device may be used for distance measurement. For example, a WiFi wireless router equipped with an accessory distance measurement device may be used to measure the distance of a mobile phone. The accessory device does not function as a hot spot for WiFi to access Internet, and it does not conduct business data transmission with mobile phones. It receives RF signals from mobile phones and the wireless router and sends the distance measurement result to the wireless router. The accessory distance measurement device can be a separate device from a wireless router in without the function of business data transmission between the wireless router and mobile phones. It can be a wireless router with reduced functions, or can exist as an independent piece of hardware in the wireless network, or can take the form of an application APP loaded to a mobile device such as a mobile phone. The wireless router, the accessory distance measurement device and the mobile phone can form a triangular distance measurement scheme, or may even form a distance measurement scheme with more points.

In some other examples, an accessory distance measurement device can be implemented in a separate device from the wireless router. The accessory distance measurement device can measure and send the distance between the mobile device and the accessory distance measurement device to the wireless router.

The system shown in FIG. 1 further comprises an identity information collection module 104. According to the location information of a mobile phone, the identity information collection module 104 establishes a corresponding relation between the predetermined location model and the identity information of the mobile phone, and stores the identity information of the mobile phone and the corresponding relation. The identity information of the mobile phone comprises the mobile phone's IP address, MAC address, mobile phone number, and mobile device device number, such as IMEI number. Such identity information can be unique to a mobile device such as a mobile phone. In addition, the identity information of the mobile phone may further comprise manufacturer logo and time stamp.

When the identity information of the mobile phone is consistent with or matches the corresponding relation, the wireless router collects the identity information of the mobile phone from the signals sent by the mobile phone. The location model can include, for example, the information of distance, relative position or movement track of the mobile phone relative to the wireless router or an accessory distance measurement device.

The system shown in FIG. 1 further comprises an authentication and authorization module 108, which defines certain time and space. When the distance measurement results provided by the wireless distance-measuring and positioning module 102 on a mobile phone satisfy the defined temporal and spatial characteristics, the mobile phone is allowed to access the wireless network, thereby completing authentication and authorization. For example, the output result from the positioning module 102 indicates that the mobile phone is within 5 cm of the wireless router and this state continues for 3 seconds. In this example, the time and space model predefined by the authorization module 108 is that access is allowed for a duration of 3 seconds within a 5 cm range, then the authentication and authorization is successful. The authorization module 108 may define a variety of time and space models, or may define a model having only spatial parameters, i.e. a location model in a narrow sense. For example, a mobile phone is allowed to access as long as it gets in the 5 cm distance range from the wireless router.

As discussed above, it should be noted that the "location information" herein can include the information of distance, relative position, and track, as well as the same information having a temporal attribute.

According to another implementation of the present disclosure, in the circumstance that the wireless router does not have the location information of a mobile phone, the wireless router completes authentication and authorization on the mobile phone according to the authentication and authorization mechanism that is predetermined in the authentication and authorization module 108 and in combination with the mobile phone identity information that is predetermined in the identity information collection module 104. For example, the predetermined authentication and authorization mechanism may allow mobile phones having certain identity information to access the Internet. The above circumstance that the wireless router does not have the location information of a mobile phone may comprise the circumstance that the mobile phone makes the first attempt to access the wireless network via the wireless router. Or, even when the wireless router has the location information of a mobile phone, it may still use this way to completes authentication and authorization according to the mobile phone's identity information and the predetermined authentication and authorization mechanism.

The system shown in FIG. 1 further comprises an identity verification module 106, a second verification module 110, an intelligent learning module 112 and a cloud platform module 114.

The identity verification module 106 stores the corresponding relation between the location model and access authority, and the location model may comprise the distance between a mobile phone and the wireless router, the association between the distance and time, changes to the mobile phone track, etc. It matches the location information outputted by the wireless distance-measuring and positioning module with the stored location model, and awards mobile phones that meet different models with different access authorities, such as accessing or pushing different information, or providing prompt with a sound signal or optical signal, or sending information to other participants within the network. When the location information comprises complex temporal and spatial information, such as the track, the matching will probably not be a complete matching, but a matching that may be expressed with a value less than 1. Such a matching process is well known to those skilled in the art, which will not be described herein. The identity verification module 106 may set up a threshold value for the degree of matching, and consequently assign a matching at a degree to a corresponding authority. Similarly, matching may be determined in such a way for both the identity information collection module and the authentication and authorization module.

In some implementations, as a supplement to the authentication and authorization module 108, the second verification module 110 performs the second verification on a mobile device that has been successfully authenticated and authorized by the authorization module 108, and the verification method includes, for example, user name password, fingerprint, iris, sound wave, two-dimensional code or dynamic password.

The second verification module 110 may be implemented either as hardware or as a software application, e.g., a mobile APP. It can be implemented in the wireless router, independently or even in a third device such as, for example, a mobile phone or other mobile device that is in communications with the wireless router.

The intelligent learning module 112 stores a location model, identity information, the corresponding relation between the location model and identity information, and the corresponding relation between the location model and access authority in a comprehensive way. It sends the above information to the cloud platform module 114, receives updates made by the cloud platform module 114 to the above information, and thereby updates and adjusts the information in the identity information collection module 104, the identity verification module 106, the authentication and authorization module 108, and the second verification module 110, so as to update and adjust the strategy of authentication and authorization to meet different access needs by different users and the needs by different applications.

The input information to the intelligent learning module 112 comprises the input information and output records of the wireless distance-measuring and positioning module 102, the identity information collection module 104, the identity verification module 106, the authentication and authorization module 108, the second verification module 110 and the cloud platform module 114. The output information to the intelligent learning module 112 comprises function adjustments and adjustments to the output results of the wireless distance-measuring and positioning module 102, the identity information collection module 104, the identity verification module 106, the authentication and authorization module 108, the second verification module 110 and the cloud platform module 114.

The intelligent learning module 112 can be implemented locally in the wireless router other than the cloud platform. It may also be implemented remotely, e.g., a device on the network. Because the wireless router maintains the data transmission with the network, the local implementation achieves the similar results as the non-local implementation.

In another example, the cloud platform module 114 can be implemented in a non-local network device, for example, one or more servers. The cloud platform module 114 receives and stores the information in all other modules sent by the intelligent learning module 112, performs analysis and adjustments to them, and passes the analysis and adjustment results down to the intelligent learning module 112, thereby achieving corresponding changes to the authentication and authorization mechanism of the wireless router.

Similar to the above APP implementation of the second verification module, the wireless distance-measuring and positioning module 102, the identity information collection module 104, the identity verification module 106, the authentication and authorization module 108, and the intelligent learning module 112 may also be implemented either as hardware or as software applications, i.e. APP. They can be implemented in the wireless router or in a mobile device similar to a mobile phone or computer, in particular a mobile phone that has been set as a WiFi hot spot. After the installation of the software application, the mobile device may also be capable of distance measurement and positioning, and achieve the functions of the above modules. In the documents that describe the present disclosure, therefore, the term "router" should be interpreted as a radio-based data reception, transformation and transmission device in a broad sense, which is not just a router in the commercial sense, but also comprises mobile devices set as WiFi hot spots and mobile devices capable of executing authentication and authorization or other similar devices, and further comprises "wireless gateway" or "intelligent gateway."

The above location information may be the location information of a mobile device relative to a wireless router, or the location information of a mobile device relative to an accessory distance measurement device, or other devices capable of corresponding functions, for example, another mobile device installed with APP that has been verified, authenticated and authorized.

In addition, not every one of the modules shown in FIG. 1 is a required part to implement the solution of the present disclosure. When the solution of the present disclosure is implemented, these parts may be accepted, rejected or combined in a variety of ways according to technical rationality and specific demand. To show them all in FIG. 1 is for the purpose of concise and convenient description. Similarly, the "mobile device" also comprises clients and other devices that are installed with client software and therefore can establish connection with a wireless router.

The above solution of the present disclosure realizes a process of authentication and authorization with reduced artificial intervention such that it becomes more simple and convenient, improves user experience, and creates conditions for realizing some specific wireless network-based applications.

Figure 2:
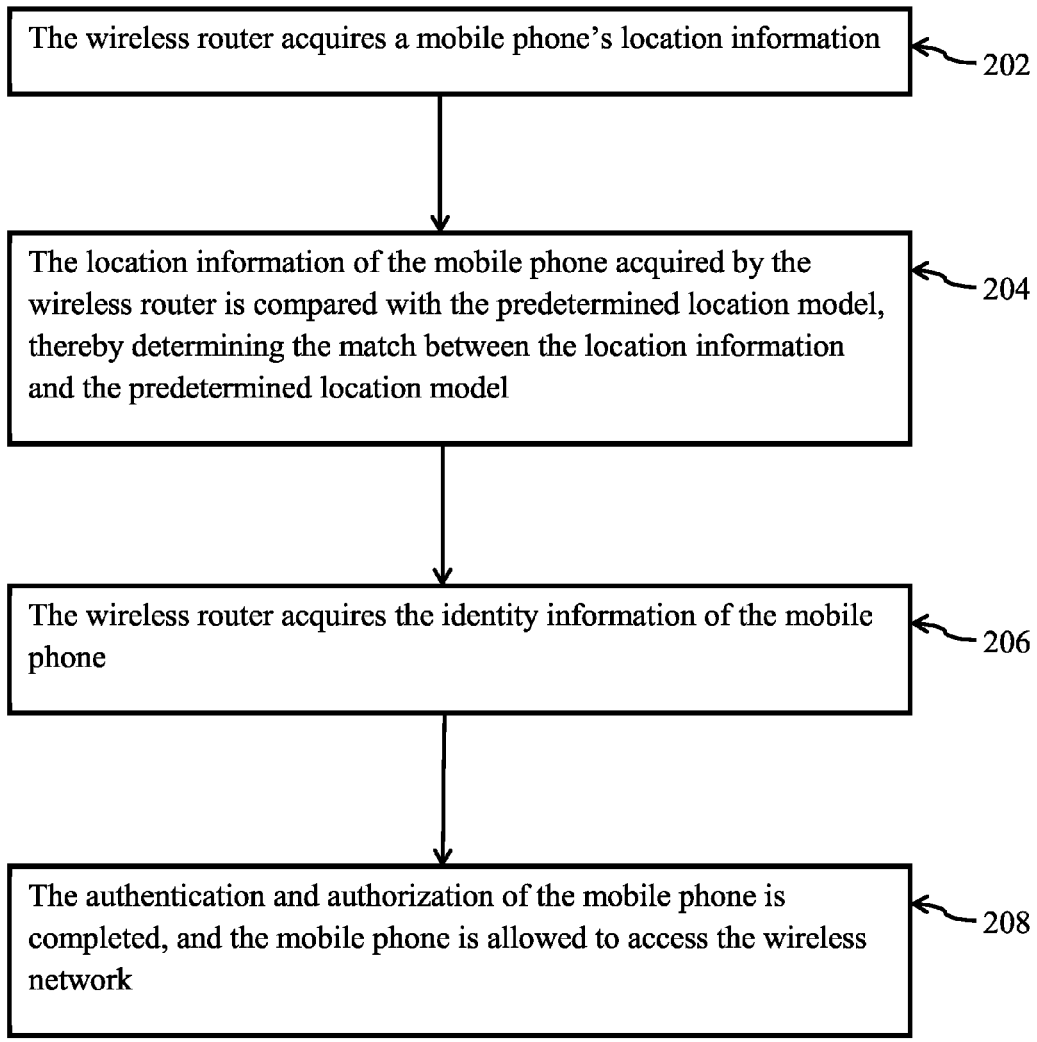
FIG. 2 is a flowchart of an example method of wireless network authentication and authorization according to an implementation of the present disclosure.

FIG. 2 is a flowchart 200 of an example method of wireless network authentication according to implementations of the present disclosure. The method can be implemented as a software program that can be executed by a mobile device (such as the mobile device in FIG. 1), or as specialized hardware, or a combination of software and hardware as discussed in additional details hereinafter.

At a step 202, location information of a mobile device, such as the mobile device in FIG. 1, is received. The location information can be received by, for the example, the wireless router in FIG. 1, a cloud server, or any other computing device.

The location information can include spatial information such as, for example, location of the mobile device, relative distance of the mobile device to the wireless router, and tracking information. The location information can also include temporal information or a combination of the spatial information and the temporal information. When combining the spatial information and the temporal information, a temporal and spatial location model can be formed, and the temporal and spatial location model can be compared with a predetermined temporal and spatial location model to find whether a match exists.

The location information can be determined between the mobile device and a remote device, such as the wireless router, an accessory distance measurement device associated with the wireless router, or another mobile device implementing the present disclosure. For example, the wireless router can measure the relative distance or position of the mobile device using RF signals received from the mobile device. Alternatively, the location information can be provided by the mobile device or a third party to the wireless router.

At a step 204, the location information of the mobile device received by the wireless router is compared with a predetermined location model to determine whether a match exists between the location information and the predetermined location model.

For example, the predetermined location model can include both spatial and location information, such as that the location information of the mobile device is within 5 cm of the wireless router, and stays there for longer than 3 seconds.

At a step 206, the identity information of the mobile device is obtained by the wireless router.

At a step 208, the authentication and authorization of the mobile phone is completed, and the mobile phone is allowed to access the wireless network.

In some implementations, flowchart 200 can further include a step of granting an access authority to the mobile device according to a corresponding relation between the predetermined location model and network authority based on the location information of the mobile device.

In some implementations, flowchart 200 can further include a step of a second verification process, which completes the authentication and authorization of the mobile phone according to user name password, fingerprint, iris, sound wave, two-dimensional code or dynamic password.

In some implementations, flowchart 200 can further include a step of sending the location information, the location model, the corresponding relation between the location model and access authority, and the identity information of the mobile device to a cloud server connected via a network, the cloud server analyzes the received information, makes adjustment or revision to the location model, the corresponding relation between the location model and access authority according to user behavior, user need and application need, and sends the adjustment and revision down to the wireless router and associated APP, thereby carrying out the authentication and authorization of the mobile phone according to the adjusted and revised conditions.

In some implementations, the wireless router (and the algorithms, methods, and instructions stored thereon and/or executed thereby) can be realized in hardware including intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. The terms "signal" and "data" are used interchangeably. Further, portions of the mobile device and the wireless router do not necessarily have to be implemented in the same manner.

In some implementations, the wireless router can be implemented using general purpose computers/processors with a computer program that, when executed, carries out any of the respective methods, algorithms and/or instructions described herein. In addition or alternatively, special purpose computers/processors are utilized that contain specialized hardware for carrying out any of the methods, algorithms, or instructions described herein.

Further, all or a portion of implementations can take the form of a computer program product accessible from, for example, a non-transitory computer-usable or computer-readable medium. In an implementation, a non-transitory computer-usable or computer-readable medium can be any device that can tangibly contain, store, communicate, or transport the program for use by or in connection with any processor. The non-transitory medium can be an electronic device, magnetic device, optical device, electromagnetic device, or a semiconductor device. Other suitable mediums are also available.

While this disclosure includes what is presently considered to be the most practical and preferred embodiments or implementations, it is to be understood that the disclosure is not to be limited to the disclosed embodiments or implementations but is intended to cover various modifications and equivalent arrangements included within the spirit and scope of the claims, which scope is to be accorded the broadest interpretation so as to encompass all such modifications and equivalents (such as equivalent structures) as are permitted under the law.

It should be understood to those of ordinary skills in the art that the implementations of the present disclosure may be presented as methods, apparatus, systems or computer program products. Accordingly, the present disclosure may take the form of an entirely hardware implementation, an entirely software implementation, or an implementation combining hardware and software. Moreover, the present disclosure may take the form of a computer program product which may be implemented on one or more computer usable storage media in which computer usable program code is contained.

It should be understood that each block or flow in the flowcharts may be realized by computer program instructions. These instructions may be provided into a processor of a data processing apparatus such as a computer, a networking device, a wireless router, etc., and/or stored in a computer-readable memory that can direct the computer or other data processing apparatus to execute a series of operation realizing the functions specified in the one or more flows, blocks or steps described above.

The invention claimed is:

1. An apparatus for authentication and authorization of a wireless network, comprising:
   a processor; and
   a memory coupled to the processor, the memory configured to store a set of instructions which when executed by the processor become operational with the processor to:
      receive location information of a mobile device, from the mobile device, wherein the location information comprises spatial data and temporal data, wherein the spatial data includes a distance between the mobile device and a router and the temporal data includes a time period that the mobile device is within a threshold distance of the router;
      receive, from a distance measurement device, radio frequency (RF) signals to determine the distance of the mobile device;
      compare the location information of the mobile device to a predetermined location model comprising predetermined spatial data and predetermined temporal data to determine whether a match between the location information and the predetermined location model exists, the predetermined spatial data corresponding to the spatial data and including a threshold distance of five centimeters, the predetermined temporal data corresponding to the temporal data and including a threshold time period of three seconds, wherein the match is determined to exist when the distance between the mobile device and the router is not greater than the threshold distance of five centimeters and the time period that the mobile device is within the threshold distance of the router is at least equal to the threshold time period of three seconds and wherein the match is determined not to exist when the distance between the mobile device and the router is greater than the threshold distance of five centimeters;
      responsive to a determination that a match between the location information and the predetermined location model exists, obtain identity information of the mobile device; and
      responsive to a determination that a match between the location information and the predetermined location model exists, complete authentication and authorization of the mobile device and permit the mobile device to access the wireless network.

2. The apparatus of claim 1, wherein the memory is further configured to store a set of instructions which when executed by the processor become operational with the processor to:
      determine, for the mobile device, an access authority according to a corresponding relation between the predetermined location model and the access authority based on the mobile device's location information.

3. The apparatus of claim 1, wherein the memory is further configured to store a set of instructions which when executed by the processor become operational with the processor to:
      authenticate the mobile device based on at least one of: a username, a password, a fingerprint, an iris, a sound wave, a two-dimensional code and a dynamic password.

4. The apparatus of claim 2, wherein the memory is further configured to store a set of instructions which when executed by the processor become operational with the processor to:
      store the location information, the predetermined location model, the identity information of the mobile device, the corresponding relation between the predetermined location model and the identity information of the mobile device, and the corresponding relation between the location model and the access authority;
      send the location information, the predetermined location model, the identity information of the mobile device, the corresponding relation between the predetermined location model and the identity information of the mobile device, and the corresponding relation between the predetermined location model and the access authority to a cloud server connected to the apparatus via the wireless network;
      receive revisions and adjustments made by the cloud server to the location information, the predetermined location model, the identity information of the mobile device, the corresponding relation between the predetermined location model and the identity information of the mobile device, and the corresponding relation between the predetermined location model and the access authority; and
      based on the received revisions and adjustments, update the location information, the predetermined location model, the identity information of the mobile device, the corresponding relation between the predetermined location model and the identity information of the mobile device, and the corresponding relation between the predetermined location model and the access authority.

5. The apparatus of claim 1, wherein the set of instructions to receive the location information of the mobile device comprises a set of instructions to:
      receive radio frequency (RF) signals from the mobile device to measure a position of the mobile device; and
      receive the location information of the mobile device from a third party.

6. The apparatus of claim 5, wherein the location information comprises at least one of: distance information associated with the mobile device, relative location information associated with the mobile device, track information and time-dependent changes, wherein the distance, relative location and track are respectively the distance, relative location and track of the mobile device relative to the apparatus, an accessory distance measurement device of the apparatus, or another device that has been authorized by the apparatus.

7. The apparatus of claim 5, wherein the identity information of the mobile device comprises at least one of: an IP address, a MAC address, a mobile phone number, a mobile device number, a manufacturer logo and a time stamp.

8. The apparatus of claim 1, wherein the instructions to compare the location information of the mobile device with a stored predetermined location model comprising spatial data and temporal data to determine whether a match between the location information and the predetermined location model exists, wherein the match is determined by comparing the temporal data of the location information with the temporal data of the predetermined location model, and the spatial data of the location data with the spatial data of the predetermined location model further comprise instructions to:

responsive to the temporal data of the location information exceeding a temporal criteria of the predetermined location model and the location data of the location information not exceeding a location criteria of the predetermined location model, determine the match between the location information and the predetermined location model exists.

9. The apparatus of claim 1, wherein the spatial information of the predetermined location model further comprises movement track information of the mobile device relative to the router.

10. The apparatus of claim 1, wherein the memory is further configured to store a set of instructions which when executed by the processor become operational with the processor to:

determine an adjustment to the predetermined location model based on identity information of the mobile device.

11. A method for authenticating and authorizing a mobile device, comprising:

receiving, by a wireless router, location information of the mobile device, from the mobile device, wherein the location information comprises spatial data and temporal data, wherein the spatial data includes a distance between the mobile device and the wireless router and the temporal data includes a time period that the mobile device is within a threshold distance of the wireless router;

receiving, from a distance measurement device, radio frequency (RF) signals to determine the distance of the mobile device;

comparing, by the wireless router, the location information of the mobile device to a predetermined location model comprising predetermined spatial data and predetermined temporal data to determine whether a match between the location information and the predetermined location model exists, the predetermined spatial data corresponding to the spatial data and including a threshold distance of five centimeters, the predetermined temporal data corresponding to the temporal data and including a threshold time period of three seconds, wherein the match is determined to exist when the distance between the mobile device and the wireless router is not greater than the threshold distance of five centimeters and the time period that the mobile device is within the threshold distance of the wireless router is at least equal to the threshold time period of three seconds and wherein the match is determined not to exist when the distance between the mobile device and the wireless router is greater than the threshold distance of five centimeters;

responsive to a determination that a match between the location information and the predetermined location model exists, obtaining, by the wireless router, identity information of the mobile device; and responsive to a determination that a match between the location information and the predetermined location model exists, completing, by the wireless router, authentication and authorization of the mobile device and permitting the mobile device to access a wireless network, wherein, responsive to completing authentication and authorization of the mobile device, permitting the mobile device to access the wireless network when the distance between the mobile device and the wireless router is greater than the threshold distance of five centimeters.

12. The method of claim 11 further comprising:

determining, for the mobile device, an access authority according to a corresponding relation between the predetermined location model and the access authority based on the mobile device's location information.

13. The method of claim 11, further comprising:

authenticating the mobile device based on at least one of: a username, a password, a fingerprint, an iris, a sound wave, a two-dimensional code and a dynamic password.

14. The method of claim 12, further comprising:

sending the location information, the predetermined location model, the corresponding relation between the predetermined location model and the access authority, the corresponding relation between the location model and the identity information of the mobile device, and the identity information of the mobile device to a cloud server connected via the wireless network, wherein the cloud server analyzes, adjusts, or revises the identity information, and sends adjustments and revisions to an apparatus.

15. The method of claim 11, wherein receiving, by the wireless router, the location information of the mobile device further comprises:

receiving RF signals from the mobile device to measure a position of the mobile device; and receiving the location information of the mobile device from a third party.

16. The method of claim 15, wherein the location information comprises at least one of: distance information associated with the mobile device, relative location information associated with the mobile device, track information and time-dependent changes, wherein the distance, relative location and track are respectively the distance, relative location and track of the mobile device relative to the wireless router, an accessory distance measurement device of the wireless router, or another device that has been authorized by the wireless router.

17. The method of claim 15, wherein the identity information of the mobile device comprises at least one of: an IP address, a MAC address, a mobile phone number, a mobile device number, a manufacturer logo and a time stamp.

18. A non-transitory computer-readable medium having stored thereon a program of instructions executable by a router to cause the router to:

receive location information of a mobile device, from the mobile device, wherein the location information comprises spatial data and temporal data, wherein the spatial data includes a distance between the mobile device and the router and the temporal data includes a time period that the mobile device is within a threshold distance of the router;

receive, from a distance measurement device, radio frequency (RF) signals to determine the distance of the mobile device;

compare the location information of the mobile device to a predetermined location model comprising predetermined spatial data and predetermined temporal data to determine whether a match exists between the location information and the predetermined location model, the predetermined spatial data corresponding to the spatial data and including a threshold distance of five centimeters, the predetermined temporal data corresponding to the temporal data and including a threshold time period of three seconds, and the match being determined to exist when the distance between the mobile device and the router is not greater than the threshold distance of five centimeters and the time period that the mobile device is within the threshold distance of the router is at least equal to the threshold time period of three seconds and the match being determined not to exist when the distance between the mobile device and the router is greater than the threshold distance of five centimeters;

responsive to a determination that a match between the location information and the predetermined location model exists, obtain identity information of the mobile device; and responsive to a determination that a match between the location information and the predetermined location model exists, complete authentication and authorization of the mobile device and permit the mobile device to access a wireless network.

* * * * *